United States Patent [19]
Cawlfield et al.

[11] Patent Number: 5,342,601
[45] Date of Patent: Aug. 30, 1994

[54] PROCESS FOR PRODUCING CHLORINE DIOXIDE

[75] Inventors: David W. Cawlfield; Sudhir K. Mendiratta, both of Cleveland, Tenn.

[73] Assignee: Olin Corporation, Stamford, Conn.

[21] Appl. No.: 925,006

[22] Filed: Aug. 5, 1992

Related U.S. Application Data

[63] Continuation of Ser. No. 703,432, May 17, 1991, abandoned.

[51] Int. Cl.$^5$ .............................. C01B 11/02
[52] U.S. Cl. ..................... 423/478; 423/477
[58] Field of Search ................. 423/477, 478

[56] References Cited

U.S. PATENT DOCUMENTS

| | | | |
|---|---|---|---|
| 4,137,296 | 1/1979 | Glew | 423/500 |
| 4,362,707 | 12/1982 | Hardee et al. | 204/101 |
| 4,381,290 | 4/1983 | Hardee et al. | 423/478 |
| 4,501,824 | 2/1985 | Hardee et al. | 502/339 |

OTHER PUBLICATIONS

Michell Sienko, et al., "Chemistry", 1961, pp. 536–539.

*Primary Examiner*—Benjamin R. Fuller
*Assistant Examiner*—Valerie Ann Lund
*Attorney, Agent, or Firm*—William A. Simons

[57] ABSTRACT

A process which comprises heating a reaction mixture comprised of an aqueous solution containing perchlorate ions, chlorate ions and hydrogen ions to produce chlorine dioxide and oxygen gas.

The novel process of the present invention provides a commercially viable process for producing chlorine dioxide from mixtures of oxy-chlorine species in the absence of a reducing agent. The process can be operated without producing an acidic salt by-product while producing a chlorine dioxide product which is substantially free of chlorine. In addition, the process of the invention permits a reduction in the amount of acid fed to the chlorine dioxide generator.

21 Claims, No Drawings

PROCESS FOR PRODUCING CHLORINE DIOXIDE

This application is a continuation of application Ser. No. 07/703,432, filed May 17, 1991, now abandoned.

BACKGROUND OF THE INVENTION

This invention relates to a process for producing chlorine dioxide. More particularly, this invention relates to the production of chlorine dioxide from a chloric acid solution.

Chlorine dioxide has found wide use as a disinfectant in water treatment/purification, as a bleaching agent in pulp and paper production, and a number of other uses because of its high oxidizing power. There are a number of chlorine dioxide generator systems and processes available in the marketplace. Most of the very large scale generators utilize a chlorate salt, a chloride ion source or reducing agent, and a strong acid. In the presence of chloride ion and acid, chlorate ion reacts to produce a mixture of chlorine and chlorine dioxide. The chlorine present is an undesired by-product.

Many processes have been developed to produce chlorine dioxide with lower chlorine concentrations by adding a reducing agent. Reducing agents which have been used include methanol or other organic compounds, sulfur, sulfur dioxide or other sulfur-oxygen species having a sulfur valence of less than +6, and carbon monoxide among others. When organic compounds are used, unreacted volatile organics including formic acid are present in the product gas.

Using sulfur containing reducing agents, the sulfate or sulfuric acid produced accumulates as a waste product. When gaseous reducing agents such as sulfur dioxide or carbon monoxide are employed, reactor designs and process control systems must protect against unreacted reducing agent leaving the system with the chlorine dioxide gas.

In addition, prior art processes for the production of chlorine dioxide from chlorate salts require an excess of the acid used. This acid is slowly neutralized by the accumulation of alkali metal ions that enter the process with the chlorate salt. The accumulation of salts must be removed as a waste stream, either liquid or solid, in every process currently practised commercially.

To avoid the formation of an acidic alkali metal salt, it has been proposed that chlorine dioxide be prepared from chloric acid. Chloric acid is, however, not commercially available. Its preparation has been taught, for example, in U.S. Pat. No. 3,810,969 issued May 14, 1974 to A. A. Schlumberger. Schlumberger teaches a process for producing chloric acid by passing an aqueous solution containing from 0.2 gram mole to 11 gram moles per liter of an alkali metal chlorate such as sodium chlorate through a selected cationic exchange resin at a temperature from 5° to 40° C. The process produces an aqueous solution containing from 0.2 gram mole to about 4.0 gram moles of $HClO_3$.

K. L. Hardee et al, in U.S. Pat. No. 4,798,715 issued Jan. 17, 1989, describe a process for chlorine dioxide which electrolyzes a chloric acid solution produced by passing an aqueous solution of an alkali metal chlorate through an ion exchange resin. The electrolysis is carried out using an electrocatalytic cathode where the catalyst is, for example, one or more valve metal oxides which may be combined with a platinum group metal oxide, or a platinum group metal, or oxides of a platinum group metal, magnetite, ferrite, or mixed metal oxides.

The electrolyzed solution contains a mixture of chlorine dioxide, and chloric acid which is fed to an extractor in which the chlorine dioxide is stripped off. The ion exchange resin is regenerated with hydrochloric acid and an acidic solution of an alkali metal chloride formed. Hardee et al teach that the electrocatalyst may also be used to convert the chloric acid to chlorine dioxide in a catalytic reactor.

Processes which produce chloric acid in an ion exchange resin require the regeneration of the ion exchange resin with acid to remove the alkali metal ions and the use or treatment and disposal of the acidic salt solution. In addition, the concentration of chloric acid which can be produced by an ion exchange process is limited as more concentrated chloric acid solutions attack the ion exchange resins used in the process.

SUMMARY OF THE INVENTION

Now a process has been discovered which produces chlorine dioxide from mixtures of oxy-chlorine species in the absence of a reducing agent. The process can be operated without producing an acidic salt by-product while producing a chlorine dioxide product which is free of chlorine. In addition, the process of the invention permits a reduction in the amount of acid fed to the chlorine dioxide generator.

These and other advantages are accomplished in a process which comprises heating a reaction mixture comprising an aqueous solution containing perchlorate ions, chlorate ions and hydrogen ions to produce chlorine dioxide and oxygen gas.

DETAILED DESCRIPTION OF THE INVENTION

Reaction mixtures suitable for use in the novel process of the present invention are aqueous solutions containing chlorate ions, perchlorate ions and hydrogen ions. The aqueous solutions are highly acidic and have a hydrogen ion concentration of at least 2 molar and preferably at least 3 molar. The concentration of chlorate ions is at least 0.02 molar and preferably from about 0.1 to about 3 molar. Concentrations of perchlorate ions are those which provide a molar ratio of perchlorate ions to chlorate ions of from about 0.5:1 to about 100:1, and preferably from about 3:1 to about 20:1. These acidic solutions preferably are substantially free of ionic impurities such as chloride ions, alkali metal and alkaline earth metal ions.

Chlorate ions present in the reaction mixture may be provided by aqueous solutions of chloric acid, mixtures of chloric acid and non-oxidizable inorganic acids such as sulfuric acid, phosphoric acid or perchloric acid, as well as mixtures of alkali metal chlorates and non-oxidizable inorganics acids. Where it is desired to produce chlorine dioxide in the absence of an acidic salt by-product, the chlorate ions are provided by aqueous solutions of chloric acid or mixtures of chloric acid and non-oxidizable inorganic acids. Suitable concentrations of chloric acid used as the source of chlorate ions include those in the range of from about 5 to about 45 percent, preferably from about 10 to about 40 percent by weight of $HClO_3$.

To suppress or minimize the auto-oxidation of chloric acid to perchloric acid without the formation of oxygen gas, for example, where an oxygen-evolving catalyst is employed, it is preferred to use as the source of chlorate ions a mixture of chloric acid and a non-oxidizable inorganic acid in which the concentration of chloric acid is low, for example, less than about 20 percent by weight of the aqueous solution providing chlorate ions.

High purity chloric acid solutions are produced by the oxidation of high purity hypochlorous acid solutions. One process suitable for producing the chloric acid solutions heats a hypochlorous acid solution, containing from about 35 to about 60 percent by weight of HOCl, at a temperature in the range of from about 25° to about 120° C.

This process is represented by the following reactions:

$$3HOCl \longrightarrow HClO_3 + 2HCl \quad (1)$$

$$2HOCl + 2HCl \longrightarrow 2Cl_2 + 2H_2O \quad (2)$$

$$5HOCl \longrightarrow HClO_3 + 2Cl_2 + 2H_2O \quad (3)$$

Thermal oxidation of the hypochlorous acid takes place at ambient temperatures and autogenous pressures. To increase the rate of production of chloric acid the reactant may be decomposed at elevated temperatures. The concentrated hypochlorous acid solution may be heated at temperatures, for example, in the range of from about 50 to about 120, and preferably in the range of from about 70° to about 110° C. to increase the rate of decomposition of the hypochlorous acid and hence the rate of production of chloric acid.

Another process for producing the high purity chloric acid solution utilizes anodic oxidation of the high purity concentrated hypochlorous acid solution in an electrolytic cell having an anode compartment, a cathode compartment, and an cation exchange membrane separating the anode compartment from the cathode compartment. In operation, the process includes feeding an aqueous solution of hypochlorous acid to the anode compartment, and electrolizing the aqueous solution of hypochlorous solution at a temperature of from about 0° to about 40° C. to produce the chloric acid solution.

The process is represented by the following equation:

$$HOCl + 2H_2O \rightarrow HClO_3 + 2H_2 + 4e \quad (4)$$

Chloric acid solutions can be produced by these processes in any concentrations desired up to about 45% by weight of $HClO_3$. However, preferred concentrations are those in the range of from about 15 to about 40% by weight of $HClO_3$.

High purity HOCl solutions used in the production of chloric acid are produced by a process in which gaseous mixtures, having high concentrations of hypochlorous acid vapors and chlorine monoxide (dichlorine monoxide, $Cl_2O$) gas and controlled amounts of water vapor, are generated, for example, by the process described by J. P. Brennan et al in U.S. Pat. No. 4,146,578, issued Mar. 27, 1979, or WO 90/05111 published May 17, 1990 by J. K. Melton, et. al. Each of these disclosures are incorporated in their entirety by reference.

Hypochlorous acid solutions produced by these processes contain concentrations of from about 35 to about 60, and more preferably from about 40 to about 55 percent by weight of HOCl. The hypochlorous acid solutions are substantially free of ionic impurities such as chloride ions and alkali metal ions as well as metal ions such as nickel and copper or mercury, among others.

Perchlorate ions present in the reaction mixture are supplied by mixing an aqueous solution of perchloric acid, a mixture of perchloric acid and chloric acid or an aqueous solution of an alkali metal perchlorate in a non-oxidizable inorganic acid. Preferred as a source of perchloric acid is an aqueous solution of perchloric acid or an aqueous solution containing a mixture of perchloric acid and chloric acid.

A method of directly producing high purity perchloric acid initially begins with high purity chloric acid solutions such as those described above. The chloric acid is fed as the anolyte to the anode compartment of an electrolytic cell which includes a cathode compartment, the anode compartment, and a separator such as a cation exchange membrane positioned between the anode compartment and the cathode compartment.

Perchlorate ions present in the reaction mixture, while not wishing to be bound by theory, are believed to promote the formation of oxygen gas by the following reaction:

$$2HClO_3 \rightarrow 2ClO_2 + 1/2O_2 + H_2O$$

Chlorine dioxide production thus takes place in the absence of the reducing agent which has been required in $ClO_2$ processes commercially practiced up to now.

The perchlorate ions are believed to serve as a "solvent" and provide an acidic media in which $ClO_2$ and $O_2$ formation is favored.

To increase yields of chlorine dioxide and conversion efficiencies it is preferred to carry out the process in the presence of a solid surface which promotes oxygen evolution. Any solid surface may be used which facilitates oxygen formation including oxygen-evolving catalysts. Suitable as oxygen-evolving surfaces or catalysts are, for example, metals and oxides of the elements of Group VIIIA of the Periodic Table of Elements (Handbook of Chemistry and Physics. 68th Edition, CRC Press, Inc. Boca Raton, Fla., 1978-88, inside cover). Thus metals such as the platinum group metals including platinum, palladium, iridium, rhodium or ruthenium; and mixtures or alloys of these platinum group metals may be employed. Additionally oxides of platinum group metals such as iridium, rhodium or ruthenium, as well as mixtures of these oxides with platinum group metals or alloys of these precious metals could be suitably employed. Likewise, iron alloys such as stainless steel, nickel or nickel based alloys, and cobalt based alloys can be used as oxygen-evolving catalysts in the process of the invention. Other oxygen-evolving catalysts include semiconductive ceramics known as perovskites. The catalyst may be present as particles suspended in the reaction mixture or supported on an inert substrate. The oxygen-evolving catalysts may be used in the forms of a packed bed, slurries, or any structure which will suitably promote mass transfer. In a preferred embodiment of this invention, the catalyst is supported on valve metal heat exchanger surfaces to facilitate evaporation of water during the reaction. Suitable valve metals include titanium and tantalum, among others.

During operation of the process of the invention the perchlorate ions are not consumed. Where the process is operated using the oxygen-evolving catalysts, the production of oxygen gas is increased and the auto-oxidation of chloric acid or chlorate ions to perchloric acid or perchlorate ions is minimized. The concentration of chloric acid present in the reaction mixture can be increased and preferably is at least 30 percent, for example, from about 30 to about 40 percent by weight of $HCl_3$. Further, the oxygen-evolving catalysts are not removed, for example, in by-product streams during operation of the process. Any suitable amounts of the oxygen-evolving catalysts may be used which will desirably increase the reaction rate.

The process is preferably carried out at temperatures in the range of from about 40° to about 90°, and preferably at temperatures of from about 50° to about 80° C.

The product of the process of the invention is a mixture of gaseous oxygen, chlorine dioxide and water vapor. Concentrations of chlorine dioxide produced include those in the range of from about 0.5 to about 10, and, preferably from about 1 to about 6 percent by volume. The gaseous mixture contains varying concentrations of oxygen and water vapor. A typical ratio of oxygen to $ClO_2$ in the gaseous mixture is from about 1 mol of $O_2$ to about 4 mols of $ClO_2$ by volume. The gaseous product mixture contains amounts of chlorine which are considerably less than those produced in presently operated commercial processes. For example the concentrations of chlorine are less than 10%, and preferably less than 5% by volume of the chlorine dioxide in the mixture.

The novel process of the invention may be operated batchwise or continuously. When operated continuously, it is preferred to continuously add chloric acid or an acidic solution of chlorate to the generator and remove the gaseous mixture of $ClO_2$, $O_2$ and water vapor as product from the generator in amounts or ratios which maintain a concentrated perchloric acid solution in the generator. When operated continuously, the process of the invention converts essentially all of the chlorate ions to chlorine dioxide.

The novel process of the present invention is further illustrated by the following examples with no intention of being limited thereby. All parts and percentages are by weight unless otherwise indicated.

EXAMPLE 1

As the chlorine dioxide generating apparatus, a round bottom glass flask was placed on a heating mantle containing a variable speed magnetic stirring mechanism. A teflon encapsulated magnet provided aggitation inside the flask. To the flask was connected a vacuum gauge, a thermometer, and an eductor providing vacuum. The eductor was operated using a solution of KI pumped from a tank to which the effluent from the eductor was returned.

Into the eductor tank, 225 gms of KI and 15 liters of water were added. Into the reactor, 50 gms of a solution containing 24.41% HClO3, and 28.89% HClO4 in equimolar amounts. Also added to the reactor was 0.5 grams of powdered ruthenium oxide (Aldrich Chemical Co.). After applying vacuum to the reactor, the heater was energized and the power regulated until the temperature was approximately 60 degrees C. and the pressure was approximately 25 inches of mercury vacuum. Samples of the product tank were removed and analyzed iodometrically for reacted chlorine and chlorine dioxide. The reaction was essentially complete in 75 minutes. After five hours, the remaining solution was analyzed for chloric and perchloric acid.

The results, in which the product and generator solution are expressed in milliequivalents, are as follows:

| Time | Product* | | Generator Solutions* | |
|---|---|---|---|---|
| (Min) | ClO2 | Cl2 | HClO3 | HClO4 |
| 0 | 0 | 0 | 138.4 | 148.9 |
| 20 | 63.22 | 0.15 | | |
| 75 | 101 | −1.3 | | |
| 235 | 113.1 | −4.3 | | |
| 300 | 118.2 | −4.3 | 2.2 | 181.2 |
| Difference | | | −136.3 | 32.3 |
| ClO2 Yield | | 86.8% | | |
| HClO3 Conv. | | 98.4% | | |

*milliequivalents.

EXAMPLE 2

To the same apparatus used in Example 1, was charged with 50 grams of a 1:2 molar mixture of chloric and perchloric acid to which 0.5 grams of ruthenium dioxide was added. This mixture was heated under vacuum as in Example 1 except that the temperature was allowed to rise to 68 degrees C. near the end of the experiment. An overall yield of 78.9% was achieved while an overall conversion of 98.7% was obtained after 2.5 hours.

The results are given below:

| Time | Product* | | Generator Solutions* | |
|---|---|---|---|---|
| (Min) | ClO2 | Cl2 | HClO3 | HClO4 |
| 0 | 0 | 0 | 75.9 | 276.2 |
| 30 | 41.1 | 0 | | |
| 90 | 59.3 | 2.4 | | |
| 150 | 59.1 | 3.25 | 1.0 | 272.8 |
| Difference | | | −74.9 | −3.4 |
| ClO2 Yield | | 78.9% | | |
| HClO3 Conv. | | 98.7% | | |

*milliequivalents.

EXAMPLE 3

Using the same apparatus and procedure of Example 1, the reaction was carried out without the addition of ruthenium oxides as the oxygen-evolving catalyst.

| Time | Product* | | Generator Solutions* | |
|---|---|---|---|---|
| (Min) | ClO2 | Cl2 | HClO3 | HClO4 |
| 0 | 0.0 | 0.0 | 144.5 | 143.8 |
| 60 | 8.6 | 1 | | |
| 180 | 18.8 | 5.1 | | |
| 360 | 50.5 | 4.3 | 59.6 | 164.9 |
| Difference | | | −84.9 | 21.1 |
| ClO2 Yield | | 59.5% | | |
| HClO3 Conv. | | 58.8% | | |

*milliequivalents.

What is claimed is:

1. A process for producing chlorine dioxide which comprises the step of:

heating a reaction mixture comprising an aqueous solution containing hydrogen ions, chlorate ions, and perchlorate ions in presence of an oxygen-evolving catalyst in solid form in absence of an added reducing agent to produce chlorine dioxide and oxygen gas;

wherein a source of the chlorate ions is a solution of chloric acid and a molar ratio of the perchlorate ions to the chlorate ions is at least about 0.5:1; and wherein said catalyst contains a metal or metal oxide wherein the metal is cobalt, iridium, iron, nickel, palladium, platinum, osmium, rhodium, ruthenium, mixtures thereof or alloys thereof.

2. The process of claim 1 wherein a concentration of the hydrogen ions is at least 2 molar.

3. The process of claim 1 wherein a concentration of the chlorate ions is at least 0.02 molar.

4. The process of claim 1 wherein the molar ratio of perchlorate ions to chlorate ions is from about 0.5:1 to about 100:1.

5. The process of claim 4 wherein the molar ratio of perchlorate ions to chlorate ions is from about 3:1 to about 20:1.

6. The process of claim 1 wherein the metal or metal oxide oxygen-evolving catalyst is palladium, platinum, iridium, rhodium, ruthenium, mixtures thereof or alloys thereof.

7. The process of claim 1 wherein the metal oxide in the oxygen-evolving catalyst is an oxide of iridium, rhodium, ruthenium or mixtures thereof.

8. The process of claim 1 wherein the chloric acid is added continuously to the reaction mixture and chlorine dioxide, oxygen, and water vapor is continuously withdrawn while maintaining a concentration of the perchlorate ions and the hydrogen ions in the reaction mixture.

9. The process of claim 8 wherein a concentration of the chloric acid is from about 5 to about 45 percent by weight of the chloric acid solution.

10. The process of claim 1 wherein a source of the perchlorate ions is an aqueous solution of perchloric acid or an aqueous solution of chloric acid and perchloric acid.

11. The process of claim 1 wherein said reaction mixture is heated at a temperature from about 40° to about 90° C.

12. A process for producing chlorine dioxide which comprises the step of:

heating from about 40° C. to about 90° C. a reaction mixture comprising an aqueous solution containing hydrogen ions, chlorate ions and perchlorate ions which is substantially free of ionic impurities in presence of oxygen evolving catalyst in solid form in absence of an added reducing agent to produce chlorine dioxide and oxygen gas;

wherein a source of said chlorate ions is chloric acid;

wherein a concentration of the hydrogen ions is at least 2 molar;

a concentration of the chlorate ions is at least 0.02 molar, and a molar ratio of the perchlorate ions to the chlorate ions is from about 0.5:1 to about 100:1; and wherein said catalyst contains a metal or metal oxide wherein the metal is cobalt, iridium, iron, nickel, palladium, platinum, osmium, rhodium, ruthenium, mixtures thereof or alloys thereof.

13. The process of claim 12 wherein the concentration of the chlorate ion in the reaction mixture is from about 0.1 to about 3 molar.

14. The process of claim 12 wherein a source of the perchlorate ions is perchloric acid or a mixture of chloric acid and perchloric acid.

15. The process of claim 12 wherein the chloric acid is added continuously to the reaction mixture and chlorine dioxide, oxygen, and water vapor is continuously withdrawn while maintaining a concentration of the perchlorate ions and the hydrogen ions in the reaction mixture.

16. A process of producing chlorine dioxide which comprises the step of:

heating a reaction mixture consisting of an aqueous mixture of hydrogen ions, chlorate ions, and perchlorate ions which are formed from essentially pure chloric and perchloric acids in presence of ruthenium oxide particles suspended in the reaction mixture in absence of an added reducing agent to produce chlorine dioxide, oxygen gas, and water vapor; and wherein a molar ratio of the perchlorate ions to the chlorate ions is at least about 0.5:1.

17. The process of claim 16 wherein a concentration of the chlorate ions is from about 0.1 to about 3 molar.

18. The process of claim 17 wherein the molar ratio of perchlorate ions to chlorate ions is from about 0.5:1 to about 100:1.

19. The process of claim 18 wherein said reaction mixture is heated at a temperature from about 40° to about 90° C.

20. The process of claim 19 wherein the molar ratio of perchlorate ions to chlorate ions is from about 3:1 to about 20:1.

21. The process of claim 20 wherein the chloric acid is added continuously to the reaction mixture and chlorine dioxide, oxygen, and water vapor is continuously withdrawn while maintaining a concentration of the perchlorate ions and the hydrogen ions in the reaction mixture.

* * * * *